United States Patent [19]

Propp et al.

[11] Patent Number: 5,727,004
[45] Date of Patent: Mar. 10, 1998

[54] METHOD AND APPARATUS FOR DATA ENCODING AND COMMUNICATION OVER NOISY MEDIA

[75] Inventors: Michael B. Propp, Brookline, Mass.; David L. Propp, Ontario, Canada

[73] Assignee: Adaptive Networks, Inc., Brighton, Mass.

[21] Appl. No.: 404,627

[22] Filed: Mar. 14, 1995

[51] Int. Cl.$^6$ .................................. H04L 7/00; H04N 7/08
[52] U.S. Cl. .................... 371/47.1; 371/43; 375/296
[58] Field of Search ............................. 371/42, 43, 46, 371/47.1, 44, 45; 375/106, 108, 110, 114, 116, 117, 39, 60, 121, 296

[56] References Cited

U.S. PATENT DOCUMENTS

| | | | |
|---|---|---|---|
| 4,787,095 | 11/1988 | Forth et al. | 375/114 |
| 4,815,106 | 3/1989 | Proppet et al. | 375/36 |
| 4,879,728 | 11/1989 | Tarallo | 375/80 |
| 5,297,185 | 3/1994 | Best et al. | 375/116 |
| 5,363,408 | 11/1994 | Paik et al. | 375/39 |
| 5,373,534 | 12/1994 | Nagamoto et al. | 375/106 |
| 5,387,941 | 2/1995 | Montgomery et al. | 348/473 |
| 5,410,360 | 4/1995 | Montgomery | 348/473 |
| 5,442,646 | 8/1995 | Chadwich et al. | 371/43 |
| 5,508,752 | 4/1996 | Kim et al. | 348/608 |

Primary Examiner—Reba I. Elmore
Assistant Examiner—Thomas Brown
Attorney, Agent, or Firm—Darby & Darby

[57] ABSTRACT

A novel apparatus and method are provided for data communication over noisy media. The apparatus includes one or both of a transmitter circuit located at a transmitting location and a receiver circuit located at a receiving location. The data is encoded to provide error correction capabilities. The encoded signal is further modified by performing one or more linear mathematical operations in order to further randomize the data signal. The transmitter circuit thus generates a wideband spread spectrum signal based on the data which is to be transmitted, which spreads the signal and improves its immunity to noise. The coding used to spread the data signal may or may not be a function of the data itself. The present invention provides enhanced noise immunity without any resulting degradation in the operation and efficiency of the error correction coding. A synchronization circuit and method are also provided for quickly achieving fast, accurate synchronization utilizing parallel synchronization and sub-bit correlation. The error correction is used to correct hard and soft errors, and dynamically adjust the combination of hard and soft errors corrected in order to improve the overall data error correction.

26 Claims, 5 Drawing Sheets

METHOD AND APPARATUS FOR DATA ENCODING AND COMMUNICATION OVER NOISY MEDIA

FIELD OF THE INVENTION

The present invention broadly relates to the field of data communications systems. More specifically, the present invention concerns a method and apparatus for reliably transmitting and/or receiving data, such as digital data, over noisy media.

BACKGROUND OF THE INVENTION

Digital data communications systems are commonly used to transmit and/or receive data between remote transmitting and receiving locations. A central facet of any data communications system is the reliability and integrity of the data which is being communicated. Ideally, the data which is being transmitted from the transmitting location should be identical to the data which is being received at the receiving location. Practically however, the data which is received at the receiving location has oftentimes been corrupted with respect to the original data that was transmitted from the transmitting location. Such data communication errors may be attributed in part to one or more of the transmission equipment, the transmission medium or the receiving equipment. With respect to the transmission medium, these types of data errors are usually attributed to the less than ideal conditions associated with the particular transmission medium.

For example, in the case of wireless communication systems, the transmission medium, which is typically air, often suffers from atmospheric and other effects that tend to degrade the data being transmitted. Some of these non ideal conditions may be modelled and taken into account in order to compensate for and thereby reduce or possibly eliminate any deleterious effects resulting therefrom. In this respect, it is generally known that signal attenuation is a function of the distance that the data signal must propagate through the atmosphere. Thus, it is possible to design a wireless communications system which is capable of transmitting a data signal sufficiently robust such that in spite of known distance-dependent atmospheric attenuation, the data signals at the receiving location can be properly and accurately received. Other types of non-idealities associated with an air or atmospheric transmission medium are often highly random events which may not be modelled a priori and thus may not be compensated for or eliminated.

The transmission of data over interconnecting wires also suffers from several noise and attenuation phenomena. Specifically, when an AC power line is used as the transmission medium, this type of system generally exhibits unpredictable transmission characteristics such as extreme attenuation at certain frequencies, phase changes along the transmission route, and notches and discontinuities. This type of system is described in U.S. Pat. No. 4,815,106, the contents of which are incorporated by reference herein. Generally, there are three modes of noise most common: Gaussian noise, low voltage impulsive interference, and very high voltage spikes. Of these three, the low voltage impulsive interference tends to be the predominant source of data transmission errors, i.e., data transmission may be reliably accomplished even in the presence of Gaussian noise. As for high voltage spikes, they are relatively infrequent and invariably cause data errors, with error detection/ retransmission (ACK/NACK) being commonly recognized as the best method of recovering the lost information. Furthermore, these characteristics may vary significantly as load conditions on the line vary, e.g., a variety of other loads being added or removed from the current-carrying line. Such loads include industrial machines, the various electrical motors of numerous appliances, light dimmer circuits, heaters and battery chargers.

To overcome these problems, data communications systems often rely on error detection and error correction schemes, to detect the occurrence of a data error and to correct a data error, respectively. One simple form of error detection is the use of a parity bit associated with each block of data to indicate whether the particular block contains an odd or even number of 1 bits. However, this is a very simple scheme which has numerous disadvantages. It is a simple type of error detection scheme which is capable of accurately detecting up to one bit error per data block. Moreover, the use of a parity bit cannot detect the occurrence of two bit errors in a data block, since this is not even detected as a parity violation. Additionally, the use of a parity bit only detects errors; it cannot correct errors. Any time that an error is detected, the receiving location typically requests retransmission of the particular data block from the transmitting location.

One type of error correction scheme commonly used in data communications systems is the use of redundant data transmissions and a voting circuit at the receiving location. In such a system, the data being transmitted is repeated a number of times, such as five. At the receiving location, all five data blocks are received and processed by a voting circuit which compares the five received versions of each data bit and determines the bit to be a 1 or 0 based on the voting consensus. Although such a system is capable of detecting and correcting data errors, it does so at a great cost in terms of the effective data throughput or transmission rate. This is due to the fact that each data block must be repeated a number of times.

Different types of data transmission formats are susceptible to different types of attenuation and distortion. Narrowband transmission formats such as frequency shift keying (FSK) or amplitude shift keying (ASK) are somewhat immune to frequency dependent attenuation, and thus may suffer little or no distortion. However, the entire band of the narrowband signal may fall into an attenuation null and be severely attenuated. Wideband transmission formats such as spread spectrum are less susceptible to the signal degradation caused by a narrowband attenuation null. However, due to the wider bandwidth associated with a spread spectrum signal, the spread spectrum signal experiences more distortion due to frequency dependent attenuation. Thus, a conventional narrowband signalling format is susceptible to attenuation while a conventional wideband signalling format is susceptible to distortion.

In addition to data integrity, communications systems must provide for synchronization between the transmitting and receiving locations. This is extremely important in order to maintain proper bit timing at the receiving location. In synchronous systems, a separate bit clock signal is included to indicate the start and end of each bit period. In asynchronous systems, a synchronization preamble having a number of bits is included at the beginning of each data block or frame in order for the receiver to lock onto and synchronize with the bit timing of the transmitter before the transmission and reception of the actual data bits.

In a conventional serial synchronization system used with phase shift keying (PSK) signalling, the receiver samples the first bit of the synchronization preamble at an arbitrary point and then correlates the sampled bit with a reference sinusoidal signal. If the arbitrarily chosen sampling point is correct, then there will be maximum correlation between the sampled bit and the reference sinusoidal signal over a portion of the bit period, i.e., bit boundaries have been correctly identified and received bits are being sampled at the proper point in time. If the correlation is less than an acceptable level, the sampling point is time shifted by a fraction of a bit period and the process repeated again. This process is repeated until the optimal bit sampling point has been determined. Serially synchronizing systems may utilize a data format with at least two carrier periods or cycles per bit interval in order to insure proper synchronization. This is due to the fact that when there is distortion in PSK signalling, in addition to the phase changes in the received data stream, the fixed sampling interval used by the receiver may not necessarily be optimally located to sample both a 1 bit and a 0 bit. The sampling interval typically spans at least an entire carrier period. Since conventional synchronization systems are not precise enough to begin sampling at the beginning of the carrier period, and instead start at a fractional point of the carrier period, two or more full carrier periods per bit are required in order to insure a sampling interval of at least one carrier period. Thus, since the sampling interval is at least an entire carrier period, and the beginning of the sampling interval may not be at the beginning of the carrier period, at least two full carrier periods are needed per bit of information. Although this approach results in improved synchronization and sampling, there is a great disadvantage in that the effective data throughput is reduced by, for example, a factor of two (two carrier periods per bit). Another major disadvantage of this type of synchronization circuit is that a long period of time, i.e., a long sequence or synchronization preamble, is required in order to achieve proper synchronization. Furthermore, since the synchronization process spans a long period of time, it itself is susceptible to time-varying noise which may affect the accuracy of the synchronization procedure.

OBJECTS OF THE INVENTION

It is an object of the present invention to provide a method and apparatus capable of efficiently communicating data over noisy media by utilizing a novel synchronization circuit which results in more robust synchronization in a shorter period of time.

It is an additional object of the present invention to provide a method and apparatus for communicating data over noisy media using a more robust and reliable hierarchical synchronization circuit.

It is a further object of the present invention to provide a method and apparatus capable of data communication over noisy media at higher data transmission rates for a given bandwidth than those afforded by conventional systems.

It is an additional object of the present invention to provide a method and apparatus for encoding data using a novel improved spread spectrum approach which provides error correction capabilities along with improved noise immunity by encoding the data and further randomizing the encoded data using one or more mathematical operators, to result in a spread spectrum format.

Yet another object of the present invention is to provide a method and apparatus for communicating data over noisy media which is capable of both hard and soft error correction, and also capable of dynamically adjusting the number of hard and soft errors being corrected.

SUMMARY OF THE INVENTION

According to the present invention, a novel apparatus and method are provided for data communication over noisy media. The apparatus includes one or both of a transmitter circuit located at a transmitting location and a receiver circuit located at a receiving location. The data is encoded to provide error correction capabilities. The encoded signal is further modified by performing one or more linear mathematical operations in order to further randomize the data signal. The transmitter circuit thus generates a wideband spread spectrum signal based on the data which is to be transmitted, which spreads the signal and improves its immunity to noise. The coding used to spread the data signal may or may not be a function of the data itself. One novel aspect of the present invention is that this enhanced noise immunity is achieved without any resulting degradation in the operation and efficiency of the error correction coding.

Data is transmitted in the form of packets or frames having a predefined format. Each data frame includes a synchronization preamble, followed by framing information, followed by the encoded data.

At the receiving location, the transmitted signal is initially received and processed by conventional front end circuitry according to the particular media over which the data was transmitted. For example, in the case of radio frequency (RF) transmission, the receiver front end circuitry includes a conventional RF receiver. Similarly, in the case of the transmission over AC power lines, the receiver front end circuitry includes appropriate surge protection and/or filtering circuits.

The received signal is then input to a synchronizing circuit which utilizes the synchronization preamble contained in the data frame to achieve proper timing and synchronization. Once synchronization is achieved, the data portion of the frame is input to a demodulator circuit which converts the data into binary digital format. At this point, the data has not yet been error detected or error corrected.

The data stream which is output by the demodulator is input to a decoder circuit which performs the error correction. The corrected bit stream is then available for subsequent use.

BRIEF DESCRIPTION OF THE DRAWINGS

Other objects, features and advantages of the invention discussed in the above brief explanation will be more clearly understood when taken together with the following detailed description of an embodiment which will be understood as being illustrative only, and the accompanying drawings reflecting aspects of that embodiment, in which.

DETAILED DESCRIPTION OF THE PREFERRED EMBODIMENTS

Figure 1:
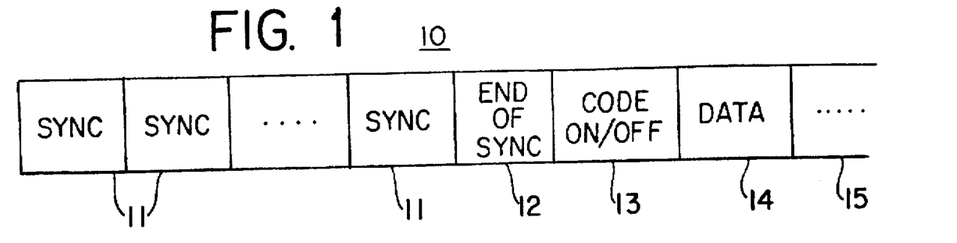
FIG. 1 is a block diagram illustrating a data frame.

FIG. 1 illustrates a data frame 10 which may be used in conjunction with the present invention. Data frame 10 includes a number of synchronization preambles 11, which are shown in detail in FIG. 2. The synchronization preambles 11 are included at the beginning of each data frame 10 in order to allow the receiver to properly synchronize to the specific bit timing used by the transmitter. The number of synchronization preambles 11 per data frame 10 varies depending on the particular characteristics and requirements of each data transmission system. Additionally, the number of synchronization preambles 11 may vary from frame to frame within a given system. This is made possible by the use of end of sync character 12. End of sync character 12 is specially chosen such that the Hamming distance between the synchronization preamble 11 and the end of sync character 12 is greater than a certain threshold amount. In other words, there is a sufficient amount of variation between the individual bits of the synchronization preamble 11 and the end of sync character 12. In this way, it is conceivable that the individual synchronization preambles 11 may be different from each other. However, the variation must be less than the threshold Hamming distance in order that the receiver not confuse a synchronization preamble with the end of sync character 12. Also, the variation between the last synchronization preamble and the end of sync character 12 must still exceed the threshold Hamming distance.

The next portion of data frame 10 is code on/off indicator 13 which indicates whether data encoding (discussed in detail below) is being used by the transmitter. Following code on/off indicator 13 is data portion 14 which contains the actual data being communicated from the transmitter to the receiver. Data frame 10 may also include additional components 15, which may be an error detecting code, such as a cyclic redundancy check (CRC).

Figure 2:
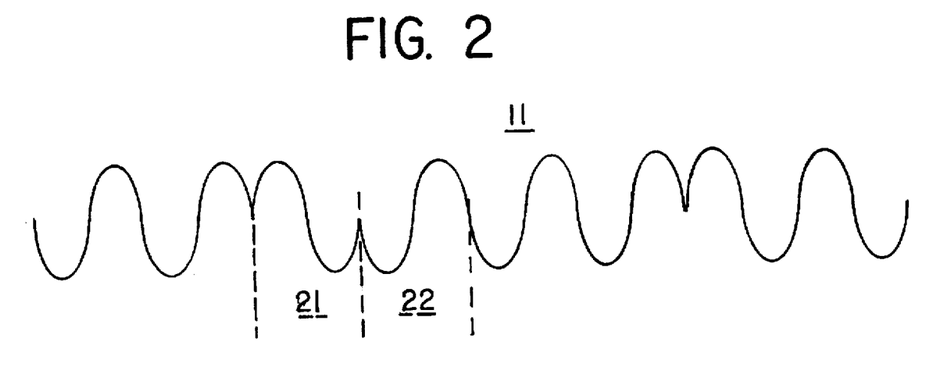
FIG. 2 is an illustration of the waveform of a synchronization preamble.

Synchronization preamble 11 is illustrated in further detail in FIG. 2. The particular signalling or coding scheme shown in FIG. 2 is PSK, where binary information is conveyed using a single frequency sinusoidal carrier, with a 1 bit indicated by the sinusoidal carrier with 0° phase change (period 21, FIG. 2) and a 0 bit indicated by the sinusoidal carrier being 180° out of phase (period 22, FIG. 2). Alternatively, differential PSK or DPSK may be used. In this latter coding scheme, a 0 bit does not contain any phase reversals, while a 1 bit is indicated by a 180° phase reversal of the sinusoidal carrier. Additional coding schemes such as FSK may also be used.

Figure 3:
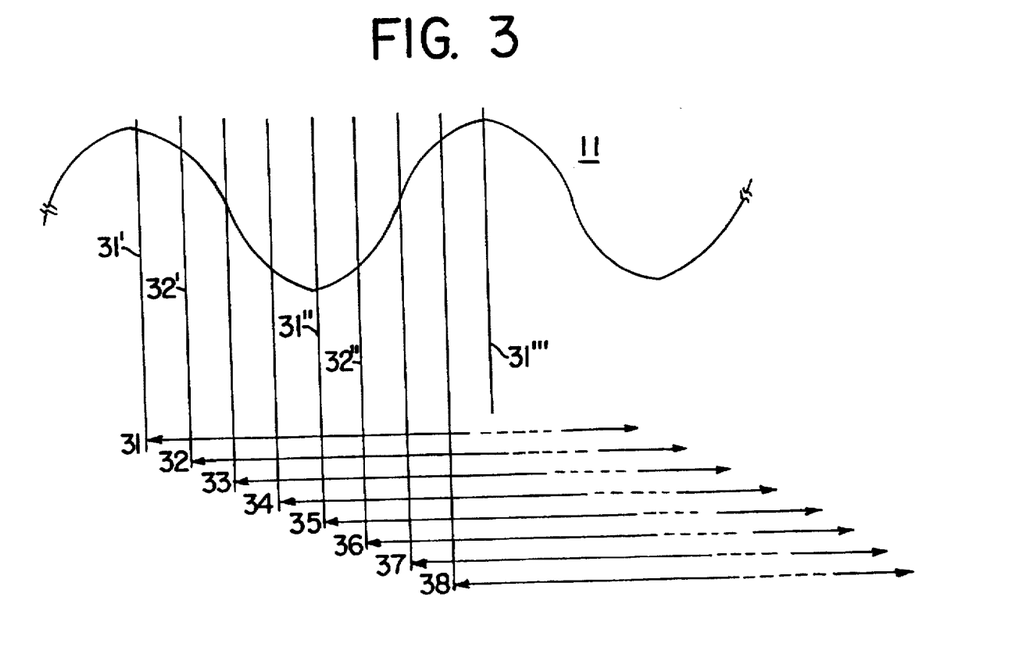
FIG. 3 is an illustration of a synchronization signal showing parallel synchronization.

The synchronization process will be described in more detail with reference to FIG. 3. As shown in FIG. 3, the synchronization preamble 11 is sampled a number of times, each one offset in time by a fraction of the sinusoidal carrier period. The fractional offset is referred to as a "clock tick." Reference numerals 31–38 indicate the staggered starting times of the synchronization preamble samples. Each of these samples indicated by 31–38 extend in time for the duration of the synchronization preamble, and are thus referred to as "strings." In the specific example illustrated in FIG. 3, the synchronization preamble 11 is sampled starting at eight staggered times to produce eight strings, each string being offset in time by one-eighth of the carrier period. Alternatively, the synchronization preamble may be sampled starting at sixteen staggered times, each string being offset in time by one-sixteenth of the carrier period. Alternatively, the 16 samples may be taken on a half carrier interval, such that there are 16 strings offset in time by 1/32 of the carrier period. In general, the greater the number of strings, the more accurate the synchronization will be. It goes without saying that a lesser or greater number of strings may be used depending on the particular application and synchronization accuracy that is desired.

In the example illustrated in FIG. 3, each of the strings 31–38 is processed by comparing or correlating portions of the string to a reference carrier waveform to produce a sequence of correlation values or indicators. Where each string is based on an eight bit synchronization preamble and the string is divided into 16 portions (two portions per bit), the correlation process will result in a sequence of 16 values for each string. For example, in the case of string 31, the first portion to be correlated extends from 31' to 31"; the second portion extends from 31" to 31'"; and so on. Similarly, the first portion of string 32 extends from 32' to 32". The correlation may be performed in the analog domain, or alternatively, the correlation may be performed against a digitized representation of the reference carrier waveform. The string that results in the best overall correlation is chosen as indicating the proper start position, i.e., synchronization, for the received signal.

Each of the strings 31–38 contains two values per bit for the entire duration of the synchronization preamble. Thus, if the synchronization preamble is eight bits, then each string 31–38 will contain a total of sixteen values. Each sixteen value string corresponding to the different starting times 31–38 is processed in order to determine the optimal sampling location from among the strings 31–38, i.e., the different starting times 31–38. The processing of the strings may be performed sequentially or in parallel.

An advantage of generating strings 31–38 in parallel from the same synchronization preamble is that the effect of time-varying noise is reduced. Alternatively, the string with starting time 31 may be generated during the first synchronization preamble, and then the starting point shifted to starting time 32 and a second string generated during the second synchronization preamble, and so on. This latter approach will be referred to as serial synchronization. However, this latter serial approach is susceptible to time-varying noise since each of the strings 31–38 is being generated during a different time interval which may possibly have different noise characteristics. Additionally, the serial approach takes a significantly longer period of time in which to synchronize. Given a sufficient period of time, the serial approach may result in accurate synchronization. However, since in certain applications synchronization must be achieved within a short, finite time, most serial approaches use fairly coarse granularity (greater time increments from string to string) in order to be able to at least locate a starting point within the short time allowed for synchronization. The result of such an approach is that the starting point is often not located with any degree of accuracy, and although synchronization is achieved, it is fairly inaccurate. The effect of inaccurate synchronization manifests itself in the data demodulation stage. Since the synchronization that is achieved is somewhat inaccurate, i.e., the starting point of the data bits is not accurately known, a greater number of carrier periods per bit are required to transmit each bit of data. This drawback of serial synchronizers is greatly reduced since the parallel synchronization of the present invention results in much more accurate synchronization. Additionally, this parallel synchronization facilitates the multiple sampling and correlation of each bit of the synchronization preamble. The multiple samples per bit are then used in a hierarchical synchronization procedure.

Figure 4:
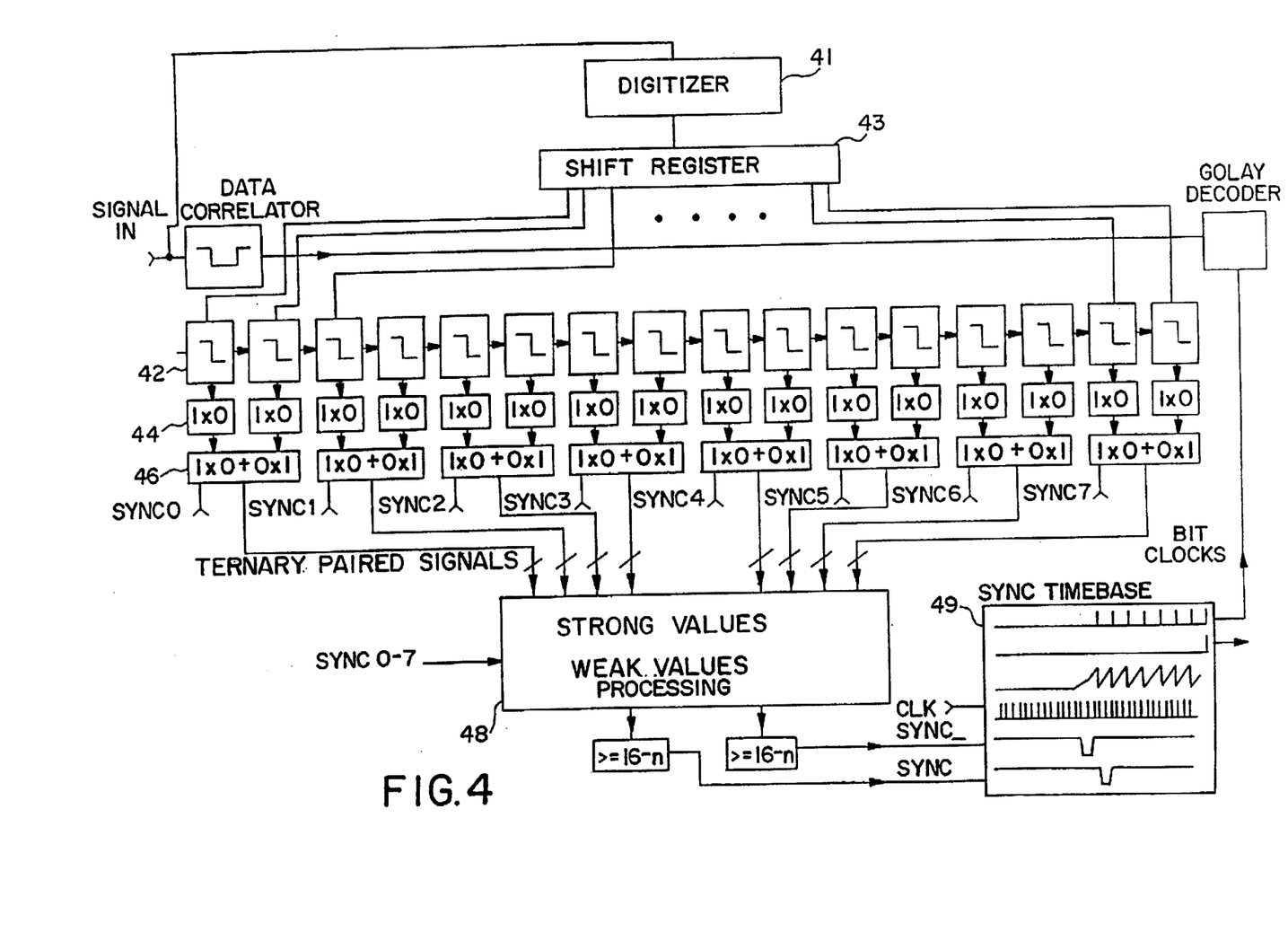
FIG. 4 is a block diagram illustrating hierarchical parallel synchronization.

The hierarchical synchronization circuit and procedure according to the present invention will now be explained with reference to FIG. 4. As shown in FIG. 4, the received signal is input to a digitizer 41, whose output is applied to a shift register 43. The shift register 43 has 16 outputs, with one each of the outputs being applied to one of the correlators 42. Each output of the shift register 43 represents a digitized portion of the string. Accordingly, each output may include a number of digitized values. In this way, the bank of correlators 42 may be used to correlate one of the strings 31–38. Subsequently, after the next clock tick, the outputs of the shift register 43 represent the next string and the bank of correlators is used to correlate the next string. Alternatively, this procedure may be performed in the analog domain using delay lines instead of the digitizer 41 and shift register 43. The hierarchical synchronization procedure illustrated in FIG. 4 operates on 16 correlation values which are the result of an eight bit synchronization preamble where each bit produces two correlation values. Thus, there are effectively two samples per bit. Each bit of the synchronization preamble may also be referred to as a chip.

The outputs of the correlators 42 are applied to ternary comparators or decision circuits 44 where each correlation value is assigned one out of a possible three different states. In this particular embodiment, if the correlation value is greater than a certain positive threshold value, it is designated as a 1. Conversely, if the correlation is less than a certain negative threshold value, it is designated as 0. All remaining cases where the correlation value is between the positive and negative threshold values, it is designated as an unknown or X value. Alternatively, the number of states to which each correlation value may be assigned may be fewer or greater than three. The 1 and 0 values may also be considered to be "strong" values, since they are known with some degree of certainty. Similarly, an unknown or X value can be considered to be a "weak" value, since it is not known with a great degree of certainty.

As shown in FIG. 4, each pair of values for the same bit of a particular string, e.g., 32'–32" and 32"–32"' in FIG. 3, is logically analyzed in comparator or decision circuit 46 in order to assign a singular or overall value to each bit. As shown in FIG. 2, each pair of valid values per bit includes both a positive-going carrier signal and a negative-going carrier signal, electrically a consistent (and valid) pair of values is actually either (1,0) or (0,1). Logically, however, these correspond to (1,1) or (0,0). If the two individual values are both 1 or both 0, the bit is assigned a 1 or 0, respectively. If the pair of values are logically inconsistent (0, 1) or (1, 0), the string is removed from further consideration due to the poor performance of the particular sampling position. Moreover, if both values for any bit are both X, the string is also removed from further consideration. If a pair of values in a string contains a single X value, the string is still retained for further consideration. However, the presence of the X value is noted and is used in the further processing discussed below. Alternatively, the overall value may be based on more than two values which may correspond to more than one bit. A comparison to a local copy (sync0–7) of the synchronization preamble may be made either on a sub-bit basis (in comparator or decision circuit 46) or on an overall bit basis (in evaluation or comparator circuit 48). Alternatively, the step of assigning an overall value based on the sub-bit values may be omitted, with the processing of the string taking into account the individual sub-bit values of the string.

Once all the strings have been processed, those strings still under consideration (i.e., those strings that contain valid values) are further analyzed in block 48 in order to accept the best possible string as the proper sampling location. As a first criteria, any accepted string must have a total number of X values which is less than a predefined maximum threshold. Of the remaining strings, the one with the least number of X values is selected as the best string. In the situation where there is a tie among a group of more than one string, the middle string from among the group is selected. When there is an even number of strings in the group either of the two middle strings may be used. The appropriate timing is then selected by block 49.

The advantages of a hierarchical synchronization system, especially a parallel system, include better, more accurate synchronization within a given period of time, as compared to conventional sequential synchronization. Additionally, the hierarchical aspect of the synchronization, wherein two samples are used for each bit of the synchronization preamble, results in a more accurate determination of the proper sampling point for subsequent data sampling.

Figure 5:
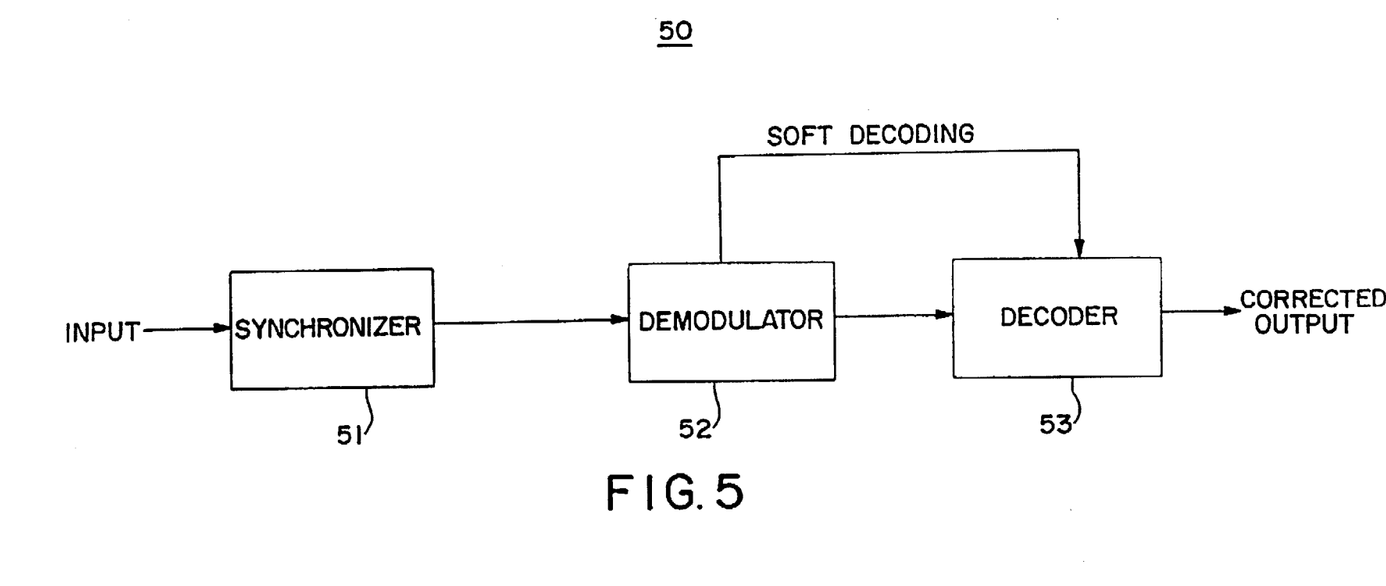
FIG. 5 is a block diagram of a portion of a receiver.

FIG. 5 is a block diagram of a portion of the receiver circuitry 50 used in connection with the present invention. The synchronization procedure described above is carried out in synchronizer circuit 51. The exact implementation of synchronizer circuit 51 may employ any of a number of known circuit techniques capable of performing the process illustrated in FIGS. 3 and 4. The output of synchronizer 51 indicates the proper data sampling point. This information is utilized by demodulator 52 which extracts the digital bits contained in each data frame. Once synchronization is achieved, the data stream may be passed directly through the synchronizer to the demodulator, since there is no need to keep performing synchronization once synchronization is achieved.

When receiver circuitry 50 is provided with a local copy of the synchronization preambles used by the transmitter circuitry, this may be accomplished during the manufacturing stage, or alternatively, this information may be provided as part of a remote or on-site servicing procedure. The local copy of the synchronization preamble is compared with the synchronization preamble received by the synchronizer 51. This comparison may be used to check accuracy, as well as to determine whether there is any wire or polarity reversal, i.e., whether the positive and negative signal lines are reversed. For this purpose, the comparison is also carried out against the complement of the pre-stored synchronization preamble sync0–7 (block 48, FIG. 4).

Decoder 53 (FIG. 5) operates on the digital bit stream output by demodulator 52 to produce a corrected output data stream. The detailed operation of decoder 53 will be explained with reference to FIG. 6 which illustrates a conventional error correction process.

Figure 6:
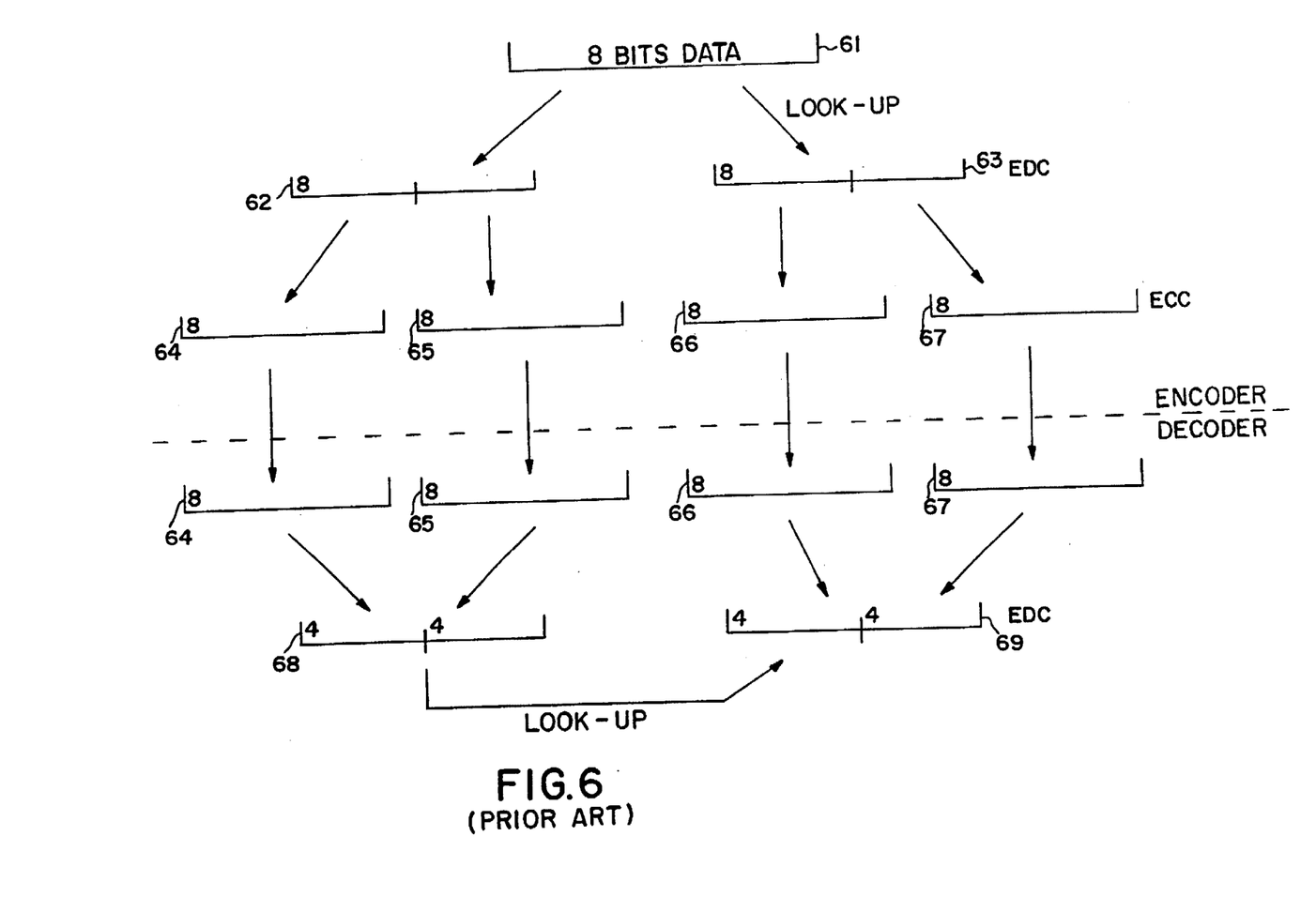
FIG. 6 is an illustration of a conventional (32, 8) block coding scheme.

As shown in FIG. 6, eight bits of original data 61 are duplicated at 62. Additionally, the eight bits of original data 61 are processed to produce an error detecting code (EDC) 63. This may be performed by carrying out the mathematical operations specified by the particular coding scheme. Alternatively, the various EDC may be calculated in advance and stored in memory, such as in a look-up table. This latter approach simplifies the required real-time computations; however, this is at the expense of requiring greater memory capabilities.

Each four bit portion of original data 62 and EDC 63 is processed to calculate an eight bit error correcting code (ECC). Since the original data 62 and EDC 63 contain a total of four four-bit segments, there will be a total of four ECC, numbered 64–67 on FIG. 6. Everything up to and including the generation of the ECC 64–67 is performed by the encoder circuitry. The four ECC 64–67 are transmitted from the encoder and subsequently received by the decoder.

The decoder performs essentially the reverse process as the encoder. At the decoder, each eight bit ECC 64–67 is converted back into a four bit word. As in the encoder, this conversion process may be performed either computationally or using a look-up table. Two of the four bit words comprise data word 68, while the other two four bit words comprise EDC 69. The error correction codes are used to correct for data transmission errors based on the fact that each received ECC corrupted by less than a maximum number of bit errors should map to the original four bit word, i.e., the nearest four bit word (in code space) is assumed to be the intended four bit word had the ECC not been so corrupted. This approach is capable of correcting bit errors up to a certain amount, because if there is an excessive amount of bit errors, the corrupted ECC will appear to map, i.e., be closer in code space, to an altogether different four bit word. The final step in the error correction process is using the received data 68 to look up its corresponding EDC, which should match with EDC 69. If there is no match, the receiver may request retransmission of the corrupted data.

The present invention utilizes a data correction system such as that of FIG. 6; however, the ECC is further randomized in order to spread the spectrum of the signal without deleteriously affecting the error correcting properties of the code. This is accomplished without introducing any unnecessary bits, such as in conventional bit stuffing or insertion approaches which result in a more randomized code at the expense of coding efficiency and effective data transmission rate. The specific error correcting code used in the present invention may be Golay coding, such as is described in Chapter 5 of S. Lin and D. J. Costello, Jr., *Error Control Coding: Fundamentals and Applications* (Prentice Hall 1983), the contents of which are incorporated herein by reference. Golay coding, which is also a block code, converts a 12 bit data word into 23 bits, using a specific mathematic generating polynomial. A parity bit may be added, resulting in a 24 bit code.

Figure 7:
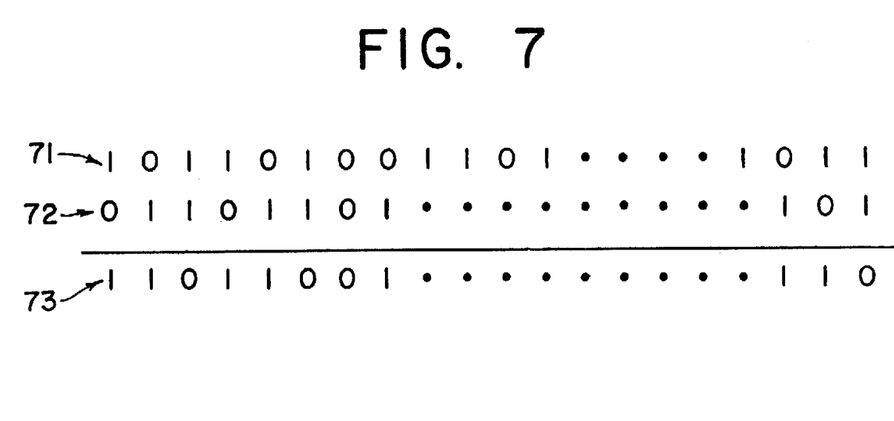
FIG. 7 is an illustration showing an offset linear operator.

In accordance with one aspect of the present invention, the 24 bit code is further randomized without having to introduce additional bits or negatively affect the error correcting properties of the code. This is accomplished using certain linear operators, such as offset and permute. The offset function is illustrated in FIG. 7, where a code word 71 is offset by offset word 72. Effectively, this is equivalent to performing an XOR operation between code word 71 and offset word 72 to produce the result 73.

Figure 8:
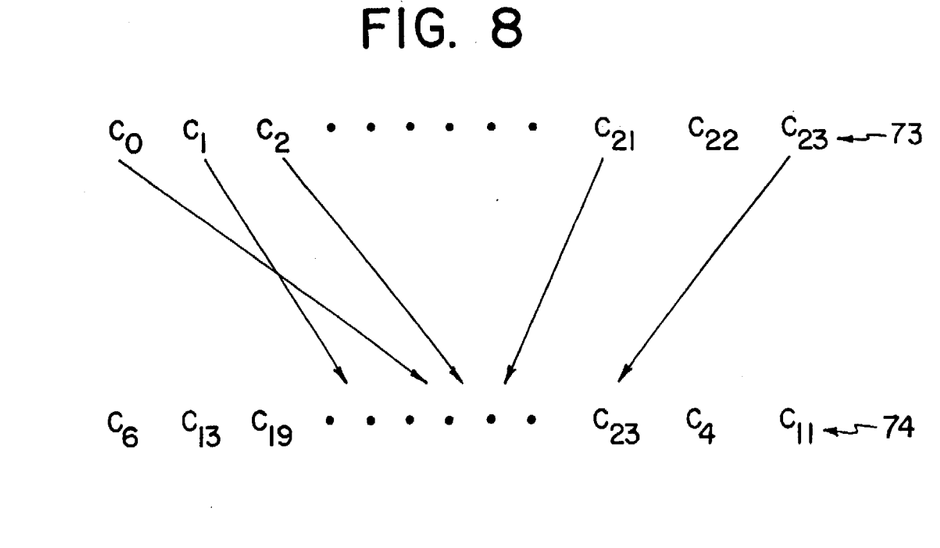
FIG. 8 is an illustration showing a permute linear operator.

The result 73 is further randomized using the permute function illustrated in FIG. 8. As seen in FIG. 8, the result 73 from the offset function is rearranged on a bit-by-bit basis, i.e., the original bits 73 are rearranged in a different sequence to produce randomized code word 74. The permute and offset functions may be carried out in any order.

The available combinations of offset word 72 and permute function are exceedingly great in number, especially when using 24 bit code words. Moreover, certain combinations will have superior randomizing properties. The present inventors have found that certain properties may be used to assess the randomizing capabilities of a particular combination when applied to a codeset or set of code words. These include the number of 0/1s in a row at the head, middle and tail of each code word in the set; the difference between the maximum and minimum run lengths of 0s or 1s; the number of run lengths in a codeword; the number of different run lengths; and the number of repetitions of a repeating pattern.

Specifically, it is desirable to minimize the maximum number of 0/1s in a row at the head, middle and tail of each code word; minimize both the maximum difference between the maximum and minimum run lengths of 0s or 1s, and the minimum difference between the maximum and minimum run lengths of 0s or 1s; minimize the maximum number of run lengths in a codeset; minimize the occurrence of only two different run lengths; and minimize the number of repetitions of a repeating pattern. Based on these criteria, one of the preferred combinations is an offset of hexadecimal 010804 and a permutation of (2, 3, 20, 19, 8, 18, 12, 4, 1, 5, 6, 10, 13, 11, 22, 16, 14, 7, 9, 0, 17, 21, 15, 23), such that the $C_2$ bit is followed by the $C_3$ bit which is followed by the $C_{20}$ bit and so on.

The error correction described above is primarily referred to as "hard" error correction. In addition to "hard" error correction, the present invention is capable of performing "soft" error correction. This is illustrated in FIG. 5. As each bit is processed in demodulator 52, it is assigned either a 1, 0, or X (unknown or erasure). Those bits initially designated as X in the demodulator 52 are all re-designated either as 1 or 0 before the entire frame is processed in the decoder 53. The re-designation X→1 or X→0 which results in the lesser number of errors corrected for the non-X bits, is chosen.

Since Golay coding fundamentally has a Hamming distance of 7 between codes, it is capable of correcting up to three "hard" errors. By adding a parity bit, the Hamming distance D is increased to 8. Generally, the combination of "hard" H and "soft" S errors that may be corrected is:

$$2H+S<D$$

where H is the number of "hard" errors, S is the number of "soft" errors and D is the Hamming distance. Thus, for example, 1 "hard" and 5 "soft" errors, or 2 "hard" and 3 "soft" errors may be corrected.

The present invention provides the capability of dynamically adjusting the number of hard and soft errors which may be corrected, based on the particular noise and distortion environment. In this way, the number of bit errors which may be corrected can be maximized or improved. This may be achieved in a number of ways. For example, if the number of retransmission requests exceeds a certain threshold over a period of time, then the combination of hard and soft errors is adjusted, for example by increasing the number of hard errors and decreasing the number of soft errors. If this results in improved performance, the process may again be repeated in order to further optimize the combination of hard and soft errors. Conversely, if this results in decreased performance, the combination of hard and soft errors is adjusted in the opposite direction in order to locate a better combination of hard and soft errors.

Alternatively, the combination of hard and soft errors may be found by analyzing the number of weak values. If the number of weak values exceeds a certain threshold amount for a given number of bits, then the number of soft errors is decreased and the number of hard errors is increased. This is due to the fact that when there is an excessive number of weak values or soft errors, and the system may only correct for a few of them, there exists a high probability that those bits which are selected for correction will not be the bits which are truly in error. Thus, it is more advantageous to target identified, hard errors for correcting.

While the invention has been particularly shown and described with reference to a preferred embodiment thereof, it will be understood by those skilled in the art that various changes in form and details may be made therein without departing from the spirit and scope of the invention.

We claim:

1. A method of detecting data signals containing a synchronization preamble to select proper bit timing, comprising the steps of:

generating a plurality of strings of said synchronization preamble, each string being sequentially offset in time by a fraction of a bit period of said synchronization preamble, said fraction being substantially proportional to said bit period divided by the number of said plurality;

correlating at least a first bit portion and a second bit portion of each bit period of the plurality of strings with a reference signal to produce at least a first correlation value and a second correlation value, each bit portion being less than said bit period;

for each first bit portion and second bit portion of each bit period, setting the value of each respective bit portion to one of a plurality of values based on the respective bit portion correlation value; and selecting a string from among the plurality of strings of said synchronization preamble as the proper bit timing based on at least one of the fewest number of a particular value and an amount of matching to a predetermined pattern.

2. The method of claim 1, wherein the setting step comprises the further step of:

setting the value of the respective bit portion to a 1 if the respective correlation value exceeds a first threshold, setting the value of the respective bit portion to a 0 if the respective correlation value is less than a second threshold, otherwise setting the value of the respective bit portion to an unknown value.

3. The method of claim 1, wherein the selecting step comprises the further step of:

determining an overall value based on at least the first bit portion value and the second bit portion value.

4. The method of claim 1, wherein the plurality of values includes at least one strong value and at least one weak value, and the particular value is a weak value.

5. The method of claim 4, comprising the further step of:

discarding synchronization preamble strings having a bit period containing two weak values.

6. The method of claim 1, wherein the plurality of strings comprises sixteen strings.

7. The method of claim 1, comprising the further step of:

discarding synchronization preamble strings having a bit period containing inconsistent values.

8. The method of claim 7, wherein the inconsistent values include a first bit portion value of 1 and a second bit portion value of 0.

9. The method of claim 7, wherein the inconsistent values include a first bit portion value of 0 and a second bit portion value of 1.

10. The method of claim 1, wherein the correlating step is carried out in parallel.

11. The method of claim 1, wherein the correlating step is carried out serially.

12. The method of claim 4, wherein the selecting step comprises the further step of:

selecting the median synchronization preamble string from among a number of synchronization preamble strings having an identical number of weak values.

13. A circuit for detecting data signals containing a synchronization preamble to select proper bit timing, comprising:

a delay circuit which generates a plurality of strings of said synchronization preamble, each string being sequentially offset in time by a fraction of a bit period of said synchronization preamble, said fraction being substantially proportional to said bit period divided by the number of said plurality;

a correlator which correlates at least a first bit portion and a second bit portion of each bit period of the plurality of strings with a reference signal to produce at least a first correlation value and a second correlation value, each bit portion being less than said bit period;

a decision circuit which for each first bit portion and second bit portion of each bit period, sets the value of each respective bit portion to one of a plurality of values based on the respective bit portion correlation value; and an evaluation circuit which selects a string from among the plurality of strings of said synchronization preamble as the proper bit timing based on at least one of the fewest number of a particular value and an amount of matching to a predetermined pattern.

14. The circuit of claim 13, wherein the decision circuit further comprises:

a specific value circuit which sets the value of the respective bit portion to a 1 if the respective correlation value exceeds a first threshold, which sets the value of the respective bit portion to a 0 if the respective correlation value is less than a second threshold, otherwise which sets the value of the respective bit portion to an unknown value.

15. The circuit of claim 13, wherein the evaluation circuit further comprises:

a circuit which determines an overall value based on at least the first bit portion value and the second bit portion value.

16. The circuit of claim 13, wherein the plurality of values includes at least one strong value and at least one weak value, and the particular value is a weak value.

17. The circuit of claim 16, further comprising:

a circuit which discards synchronization preamble strings having a bit period containing two weak values.

18. The circuit of claim 13, wherein the plurality of strings comprises sixteen strings.

19. The circuit of claim 13, further comprising:

a circuit which discards synchronization preamble strings having a bit period containing inconsistent values.

20. The circuit of claim 19, wherein the inconsistent values include a first bit portion value of 1 and a second bit portion value of 0.

21. The circuit of claim 19, wherein the inconsistent values include a first bit portion value of 0 and a second bit portion value of 1.

22. The circuit of claim 13, wherein the correlator is a parallel correlator.

23. The circuit of claim 13, wherein the correlator is a serial correlator.

24. The circuit of claim 16, wherein the evaluation circuit includes a median selector which selects the median synchronization preamble string from among a number of synchronization preamble strings having an identical number of weak values.

25. A method of data communication comprising the steps of:

encoding error correcting data signals, said encoding step comprising the step of:

randomizing the error correcting data signals using at least one linear operator to increase the randomness of the data signals without decreasing error correcting capabilities and effective signal bandwidth; and detecting data signals containing a synchronization preamble to select proper bit timing, said synchronizing step comprising the steps of:

generating a plurality of strings of said synchronization preamble, each string being sequentially offset in time by a fraction of a bit period of said synchronization preamble, said fraction being substantially equivalent to said bit period divided by the number of said plurality;

correlating at least a first bit portion and a second bit portion of each bit period of the plurality of strings with a reference signal to produce at least a first correlation value and a second correlation value, each bit portion being less than said bit period;

for each first bit portion and second bit portion of each bit period, setting the value of each respective bit portion to one of a plurality of values based on the respective bit portion correlation value; and selecting a string from among the plurality of strings of said synchronization preamble as the proper bit timing based on at least one of the fewest number of a particular value and a match to a predetermined pattern.

26. A data communication apparatus comprising:

a data encoder circuit for encoding error correcting data signals, said data encoder comprising:

a randomizer which performs at least one linear operation on said error correcting data signals to increase the randomness of the data signals without decreasing error correcting capabilities and effective signal bandwidth; and a circuit for detecting data signals containing a synchronization preamble to select proper bit timing, comprising:

a delay circuit which generates a plurality of strings of said synchronization preamble, each string being sequentially offset in time by a fraction of a bit period of said synchronization preamble, said fraction being substantially equivalent to said bit period divided by the number of said plurality;

a correlator which correlates at least a first bit portion and a second bit portion of each bit period of the plurality of strings with a reference signal to produce at least a first correlation value and a second correlation value, each bit portion being less than said bit period;

a decision circuit which for each first bit portion and second bit portion of each bit period, sets the value of each respective bit portion to one of a plurality of values based on the respective bit portion correlation value; and an evaluation circuit which selects a string from among the plurality of strings of said synchronization preamble as the proper bit timing based on at least one of the fewest number of a particular value and a match to a predetermined pattern.

\* \* \* \* \*